(12) United States Patent
Brockers et al.

(10) Patent No.: US 10,721,461 B2
(45) Date of Patent: Jul. 21, 2020

(54) COLLABORATIVE STEREO SYSTEM FOR THREE-DIMENSIONAL TERRAIN AND OBJECT RECONSTRUCTION

(71) Applicant: California Institute of Technology, Pasadena, CA (US)

(72) Inventors: Roland Brockers, Pasadena, CA (US); Curtis W. Padgett, Santa Clarita, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 0 days.

(21) Appl. No.: 16/049,309

(22) Filed: Jul. 30, 2018

(65) Prior Publication Data

US 2019/0037207 A1 Jan. 31, 2019

Related U.S. Application Data

(60) Provisional application No. 62/538,291, filed on Jul. 28, 2017.

(51) Int. Cl.
| | |
|---|---|
| *H04N 13/296* | (2018.01) |
| *G06F 1/12* | (2006.01) |
| *H04N 13/239* | (2018.01) |
| *G06T 7/73* | (2017.01) |
| *B64C 39/02* | (2006.01) |

(Continued)

(52) U.S. Cl.
CPC ......... *H04N 13/296* (2018.05); *B64C 39/024* (2013.01); *B64D 47/08* (2013.01); *G06F 1/12* (2013.01); *G06T 7/593* (2017.01); *G06T 7/74* (2017.01); *H04N 13/117* (2018.05); *H04N 13/239* (2018.05); *H04N 13/246* (2018.05); *B63B 49/00* (2013.01); *B64C 2201/123* (2013.01); *B64C 2201/127* (2013.01); *G06T 2207/10012* (2013.01); *G06T 2207/10032* (2013.01); *G06T 2207/30212* (2013.01); *G06T 2207/30244* (2013.01);

(Continued)

(58) Field of Classification Search
CPC ...... H04N 13/296; H04N 13/239; G06F 1/12; G06T 7/74; B64C 39/024; B63B 49/00; B64D 47/08
USPC ........................................................ 348/144
See application file for complete search history.

(56) References Cited

U.S. PATENT DOCUMENTS

| | | | |
|---|---|---|---|
| 2017/0251193 A1* | 8/2017 | Zhou | G01C 11/06 |
| 2018/0054604 A1* | 2/2018 | Boyd | H04N 13/239 |
| 2018/0165875 A1* | 6/2018 | Yu | G06T 7/246 |

OTHER PUBLICATIONS

PCT International Search Report & Written Opinion dated Jan. 25, 2019 for PCT Application No. PCT/US2018/054142.

(Continued)

*Primary Examiner* — On S Mung
(74) *Attorney, Agent, or Firm* — Gates & Cooper LLP

(57) ABSTRACT

A method, apparatus, and system provide for three-dimensional (3D) image reconstructing. Two or more cameras are mounted to one or more vehicles. The cameras are capable of moving with respect to each other. A baseline distance between each of the cameras is determined. A two-dimensional (2D) image is simultaneously acquired from each of the cameras. The acquiring is time synchronized and the vehicles are moving during the acquiring. The 2D images from the two or more cameras are matched. A delta pose between the cameras is reconstructed based on the matching and baseline distance. Based on the delta pose, a 3D image is instantaneously constructed.

20 Claims, 9 Drawing Sheets

(51) Int. Cl.
  B64D 47/08    (2006.01)
  B63B 49/00    (2006.01)
  H04N 13/246   (2018.01)
  H04N 13/117   (2018.01)
  G06T 7/593    (2017.01)
  H04N 13/00    (2018.01)

(52) U.S. Cl.
  CPC ............... G06T 2207/30248 (2013.01); G06T 2207/30252 (2013.01); H04N 2013/0081 (2013.01)

(56) References Cited

OTHER PUBLICATIONS

Lee, S-H., et al., "Robust Robot Navigation using Polar Coordinates in Dynamic Environments", Journal of Industrial and Intelligent Information, Mar. 2014, pp. 6-10, vol. 2, No. 1.

Fiorini, P., et al., "Motion Planning in Dynamic Environments using Velocity Obstacles", International Journal of Robotics Research, Jan. 1, 1995, pp. 1-40.

Kunwar, F., "Rendezvous-Guidance Trajectory Planning for Robotic Dynamic Obstacle Avoidance and Interception", IEEE Transactions on Systems, Man, and Cybernetics—Part B: Cybernetics, Dec. 2006, pp. 1432-1441, vol. 36, No. 6.

Bis, R., et al., "Velocity Occupancy Space: Robot Navigation and Moving Obstacle Avoidance With Sensor Uncertainty", ASME 2009 Dynamic Systems and Control Conference, vol. 1, Jan. 1, 2009. pp. 363-370, XP055543501.

Nelson, D., et al., "Vector Field Path Following for Miniature Air Vehicles", IEEE Transactions on Robotics, IEEE Service Center, Jun. 2007, pp. 519-529, vol. 23, No. 3.

Alsaab, A., et al., "Improving velocity obstacle approach for obstacle avoidance in indoor environments", 2014 UKACC International Conference on Control (CONTROL), Jul. 9, 2014, pp. 325-330.

Levy, A., et al., "The Extended Velocity Obstacle and applying ORCA in the real world", 2015 IEEE International Conference on Robotics and Automation (ICRA), May 2015, pp. 16-22.

\* cited by examiner

COLLABORATIVE STEREO SYSTEM FOR THREE-DIMENSIONAL TERRAIN AND OBJECT RECONSTRUCTION

CROSS-REFERENCE TO RELATED APPLICATIONS

This application claims the benefit under 35 U.S.C. Section 119(e) of the following co-pending and commonly-assigned U.S. provisional patent application(s), which is/are incorporated by reference herein:

Provisional Application Ser. No. 62/538,291, filed on Jul. 28, 2017, with inventor(s) Roland Brockers, Curtis W. Padgett, and Christian Brommer, entitled "Tandem Micro Air Vehicle System for Joint 3D Terrain Reconstruction."

STATEMENT REGARDING FEDERALLY SPONSORED RESEARCH AND DEVELOPMENT

The invention described herein was made in the performance of work under a NASA contract NNN12AA01C, and is subject to the provisions of Public Law 96-517 (35 USC 202) in which the Contractor has elected to retain title.

BACKGROUND OF THE INVENTION

1. Field of the Invention

The present invention relates generally to three-dimensional (3D) terrain and object reconstruction, and in particular, to a method, system, apparatus, and article of manufacture for dynamically/instantaneously reconstructing 3D terrain and objects for use in navigation, mapping, and moving target detection.

2. Description of the Related Art (Note: This application references a number of different publications as indicated throughout the specification by reference numbers enclosed in brackets, e.g., [x]. A list of these different publications ordered according to these reference numbers can be found below in the section entitled "References." Each of these publications is incorporated by reference herein.)

The standard approach for 3D terrain reconstruction (e.g., from aerial platforms) is to use a monocular camera and perform a structure from motion approach to reconstruct the overflown terrain from two different views of the camera, taken at different times during flight. Such an approach (i.e., of capturing two different views of the camera) is necessary in order to increase the distance between the two camera views, since the accuracy of 3D reconstruction directly depends on the distance between the location the images were taken. Since the images that are used for the reconstruction are taken at different times, it is impossible to get accurate range information on moving objects. While on-board stereo cameras in a rigid configuration (stereo camera head) would provide time synchronized images that are taken at the exact same time, and thus allow 3D reconstruction of movers in the field of view, such a configuration generally does not have enough baseline—the distance between the cameras—to yield the level of accuracy that is needed for adequate 3D reconstruction of distant objects.

As described above, structure from motion is a photogrammetric range imaging technique for estimating 3D structures from 2D image sequences that are coupled with local motion signals. In particular, the correspondence between captured 2D images must be identified (e.g., by tracking features from one image to a subsequent image). In this regard, a variety of techniques may be utilized to determine such a correspondence (e.g., scale-invariant feature transform [SIFT], speeded-up robust features [SURF], Lukas-Kanade tracker, etc.) and further processing may be performed to resolve any issues (e.g., random sample consensus [RANSAC] may be used to filter outlier correspondences). Once the correspondences are determined, the feature trajectories over time are used to reconstruct a 3D image, positions, and the camera's motion.

However, as multiple images are evaluated over a period of time, such techniques fail to provide an instantaneous/dynamic reconstruction of a 3D image. Accordingly, what is needed is the ability to instantaneously perform a 3D reconstruction of terrain and objects in both a static and non-static environment.

SUMMARY OF THE INVENTION

Embodiments of the invention provide a tandem camera system for collaborative instantaneous 3D reconstruction of terrain (and objects) in a static and non-static environment that can be used for robust collision avoidance as well as to track moving objects in a non-static environment.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
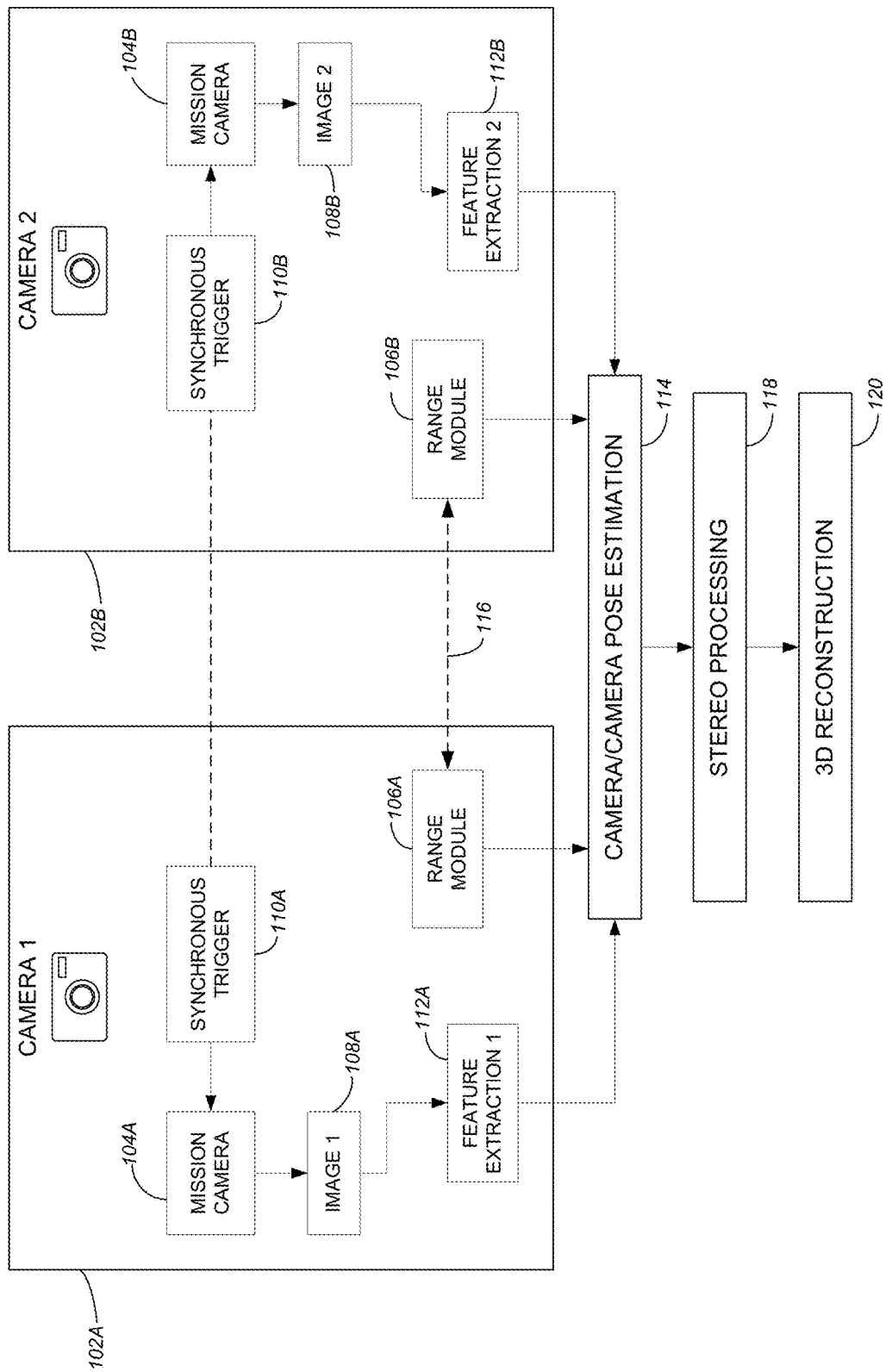
FIG. 1 illustrates a collaborative stereo system for three-dimensional terrain and object reconstruction in accordance with one or more embodiments of the invention.

FIG. 1 illustrates a collaborative stereo system for three-dimensional terrain and object reconstruction in accordance with one or more embodiments of the invention. As illustrated, there are tandem camera systems 102 (i.e., camera 1 102A and camera 2 102B). Each camera system 102 is equipped with a camera 104 and a ranging sensor 106 to determine the distance between the two systems 102. As illustrated, camera 104 may be a mission camera 104A on camera 1 system 102A and a mission camera 104B on camera 2 system 102B.

Each camera 104 is controlled by an on-board computer and image acquisition (i.e., of image 1 108A and image 2 108B) is time synchronized using synchronous triggers 110 (collectively referring to triggers 110A and 110B). A variety of mechanisms may be used to synchronize the image acquisition (e.g., via synchronous triggers 110). In one or more embodiments, clock synchronization may be utilized. Alternatively, wireless signals such as radio and/or WiFi (e.g., 5 GHz) between the two camera systems 102 may be utilized. In yet another embodiment, a wired connection may be utilized.

Feature extraction 112A and 112B (collectively referred to as feature extraction 112) is utilized to extract features from each frame of images 108. Based on feature matches between the extracted features, the camera pose for each camera 104 may be estimated/reconstructed at 114.

Further, a base line 116 (i.e., distance between the two camera systems 102) may be approximated/determined from ranging modules 106A and 106B (collectively referred to as range modules 106). As used herein, range modules 106 may be fixed (e.g., at fixed locations on a vehicle such as an airplane or ship) such that the baseline 116 is known (e.g., based on geometry, line of sight, etc.). Alternatively, the range modules 106 may determine the baseline 116 based on communication or other means between the two systems 102 (e.g., ultra-wideband [UWB] ranging [e.g., 3.1-5.3 GHz]).

Stereo processing 118 (based on the matching features 112 and camera pose 114) is performed to provide a dense 3D reconstruction 120 of the terrain/object captured in the images 108. Such a 3D reconstruction 120 may utilize calibrated camera intrinsics as well as the estimated camera delta pose 114 (camera extrinsics). Further, all of the processing (e.g., image capture, feature extraction, baseline determination, camera/camera pose estimation 114, stereo processing 118, and the resulting 3D reconstruction 120) may all be performed in real-time. The resulting 3D reconstruction 120 may provide range maps of terrain. Further, the 3D point cloud reconstruction may be utilized for collision avoidance (terrain, mid-air), terrain relative navigation, moving object detection (reconnaissance), object (e.g., aircraft and/or ship) pose estimation in non-static environments, etc.

Further to the above, camera post estimation 114, stereo processing 118, and 3D reconstruction 120 may be performed on a centralized computer (e.g., aircraft or ship), or onboard individual vehicles (e.g., tandem unmanned aerial vehicles in which cameras 102 are mounted).

Exemplary Embodiments

Embodiments of the invention may be implemented and utilized in a variety of different vehicles/environments/systems. All such different variations and embodiments are within the scope of the present invention.

Tandem Unmanned Air Vehicle (UAV)

Collaborative stereo technology for small aerial systems and unmanned aerial vehicles (UAVs) enables instantaneous 3D terrain reconstruction with adjustable resolution that can be used for robust surface relative navigation, high resolution mapping, and moving target detection.

Figure 2:
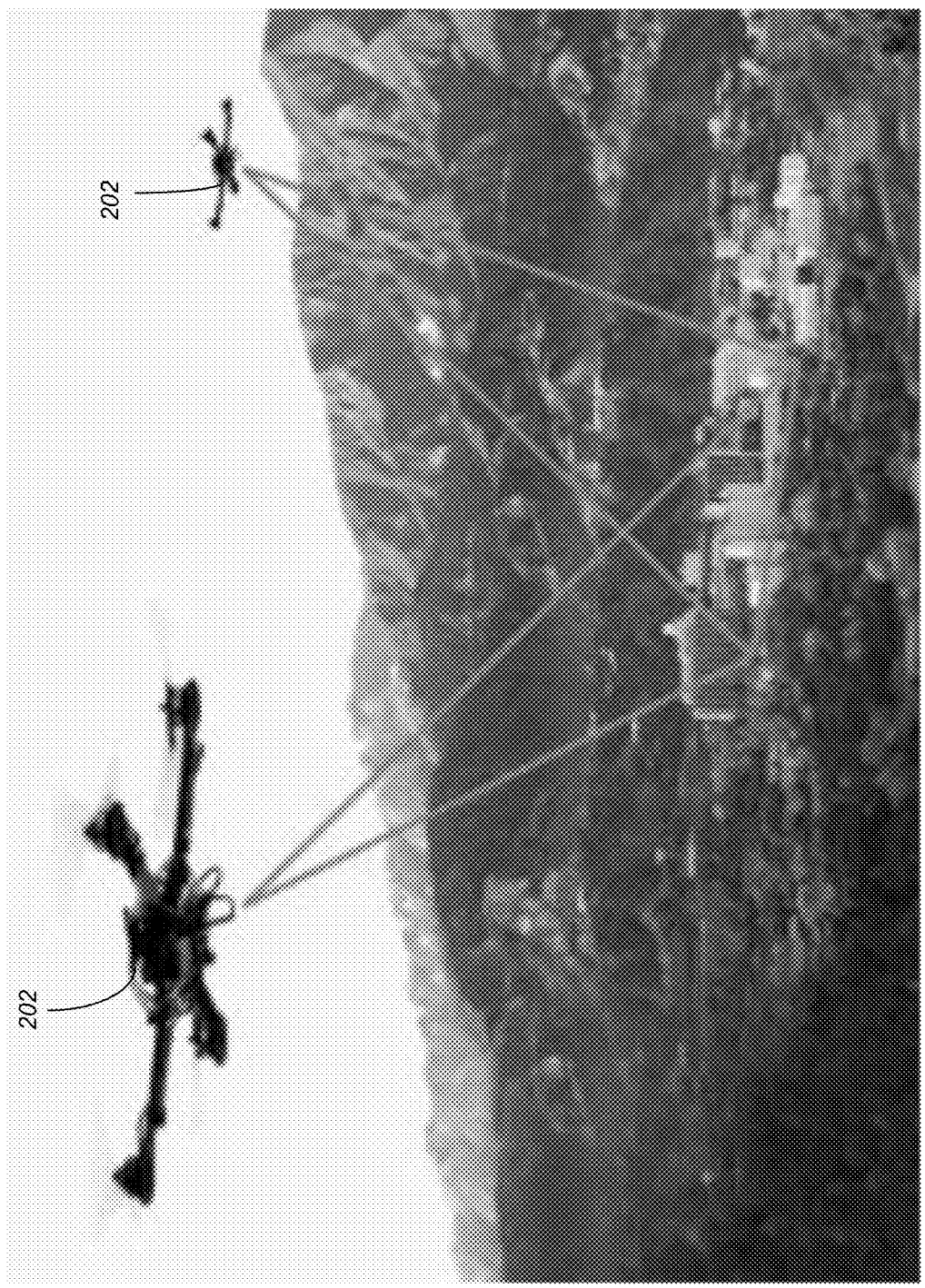
FIG. 2 illustrates adaptive resolution stereo vision with two small UAV's flying in a tandem formation to reconstruct overflown terrain in accordance with one or more embodiments of the invention.

As illustrated in FIG. 2, embodiments of the invention may provide adaptive resolution stereo vision with two small UANTs 202 flying in a tandem formation to reconstruct the overflown terrain. The accuracy of the reconstruction, which depends on the distance between the vehicles and the altitude, is adjustable during flight based on the current needs of a mission (e.g., tracking a small moving object like a pedestrian on the ground or performing terrain relative navigation at low altitudes). Applications of this technology reach from aerial surveillance systems to small body cube SAT missions where this technology could be used for object relative navigation.

In view of the above, embodiments of the invention may be utilized in a tandem micro air vehicle (MAV) or unmanned aerial vehicle (UAV) system for collaborative instantaneous 3D reconstruction of overflown terrain. As described above, conventional approaches for 3D reconstruction from airborne sensors use a monocular approach which only allows for 3D reconstruction of static objects. Embodiments of the invention does not distinguish between static and dynamic objects in the scene, since 3D reconstruction is instantaneous. This can be used for detecting moving objects on the ground by tracking the structure between reconstructions that is not static.

Accordingly, a tandem UAV system (in accordance with embodiments of the invention) consists of two UAVs 202 (i.e., serving as systems 102), each UAV 202 is equipped with a camera 104 and a ranging sensor 106 to determine the distance (i.e., baseline 116) between the two vehicles. Each camera 104 is controlled by an on-board computer and image acquisition is time synchronized using clock synchronization (via synchronous triggers 110) over WiFi or other wireless data connection between the two UAVs. Flying in a tandem formation, the two vehicles 202 form a virtual stereo camera system enabling instantaneous 3D reconstruction 120 of the overflown terrain.

While being able to control the baseline 116 between the two vehicles 202 (and thus the two cameras 104), the system is able to adapt the accuracy of 3D reconstruction 120 based on the distance of observed targets. This enables accurate 3D reconstruction of distant targets, and, since the cameras 104 are time synchronized, tracking of moving objects based on the change in 3D structure.

Furthermore the tandem formation allows pointing the cameras 104 at any target of interest, allowing e.g. to form a visual radar that reconstructs the overflown terrain in a 360 degree sweep, or to follow detected movers on the ground. In view of the above, embodiments of the invention may be completely passive, except for the communication between the two vehicles 202. Such passive communication allows for reconnaissance missions where stealthy observation is key. Furthermore, with a synchronous tandem setup, the acquired 3D information can be used by each platform to estimate its motion relative to the overflow terrain. This can be used for safe terrain relative navigation, even when the whole terrain is moving (e.g. small body missions).

Further, as described above, the components within system 102 in addition to camera post estimation 114, stereo processing 118, and 3D reconstruction 120 may be utilized on individual UAVs 202 for onboard 3D reconstruction. In such embodiments, information from one system (e.g., system 112B) may be transmitted (e.g., wirelessly), to the other system (e.g., system 112A) that is performing the onboard 3D reconstruction. Such information may include feature location and images.

Based on such an approach, embodiments of the invention enable and provide for passive 3D reconstruction for surveillance applications with the ability to track and follow movers, were stealth operation of such a system is required (e.g. harbor/maritime surveillance from ships). Further, such embodiments can be used for precision navigation on small bodies were accurate terrain relative navigation with respect to the moving body is key for maneuvering safely in close proximity of the moving surface (e.g. pin point landing on asteroids).

Aircraft Wingtip and Space Craft System

Figure 3:
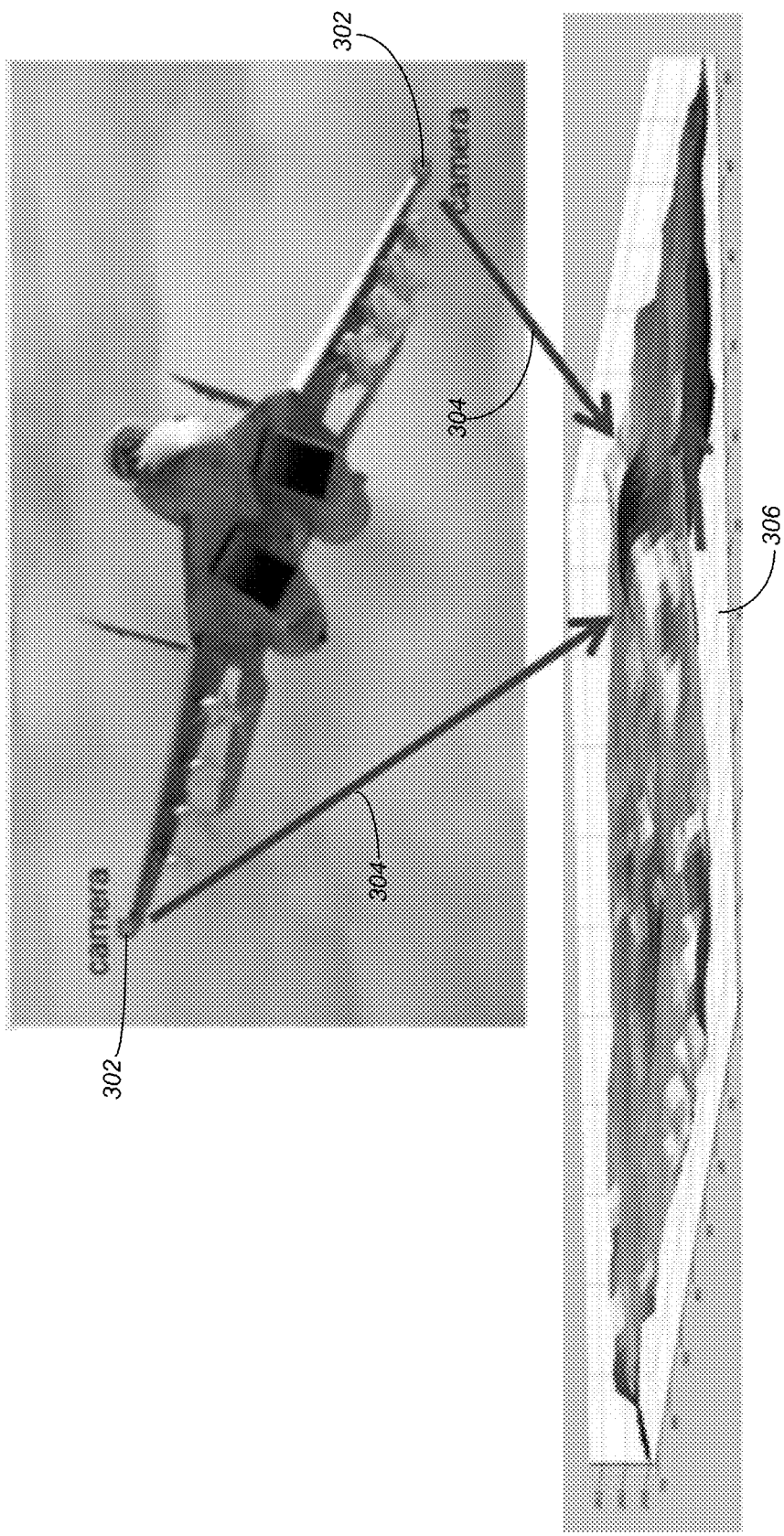
FIG. 3 illustrates an exemplary embodiment of a wingtip system in accordance with one or more embodiments of the invention.

Embodiments of the invention may be implemented in wingtip systems (e.g., aircraft) where the baseline 116 is computed based on aircraft geometry. FIG. 3 illustrates an exemplary embodiment of a wingtip system in accordance with one or more embodiments of the invention. As illustrated, cameras systems 302 are mounted on the wingtips of an aircraft that are non-static. The baseline 116 (distance between cameras 302) may be based on the geometry of the aircraft in which the cameras 302 are mounted. Such cameras may be mounted/secured within a nose cone of a wing pod and/or via any other securing means. Further, communication between the camera systems 302 may be completed via wired or wireless systems. Simultaneous images of objects/terrain are captured 304 by the camera systems 302 and based on delta pose estimation and subsequent stereo processing are used to reconstruct the 3D terrain 306.

Such embodiments may be used for robust collision avoidance (e.g., for navigation in close proximity to terrain [low altitude flight, small body navigation]). Further, 3D ranging systems may need to tolerate non-static environments (movers on the ground, UAVs in moving vegetation, small body missions, etc.), and potentially in military applications (e.g., passive 3D reconstruction method [stealth]) and detection of movers on the ground [reconnaissance]).

Figure 4:
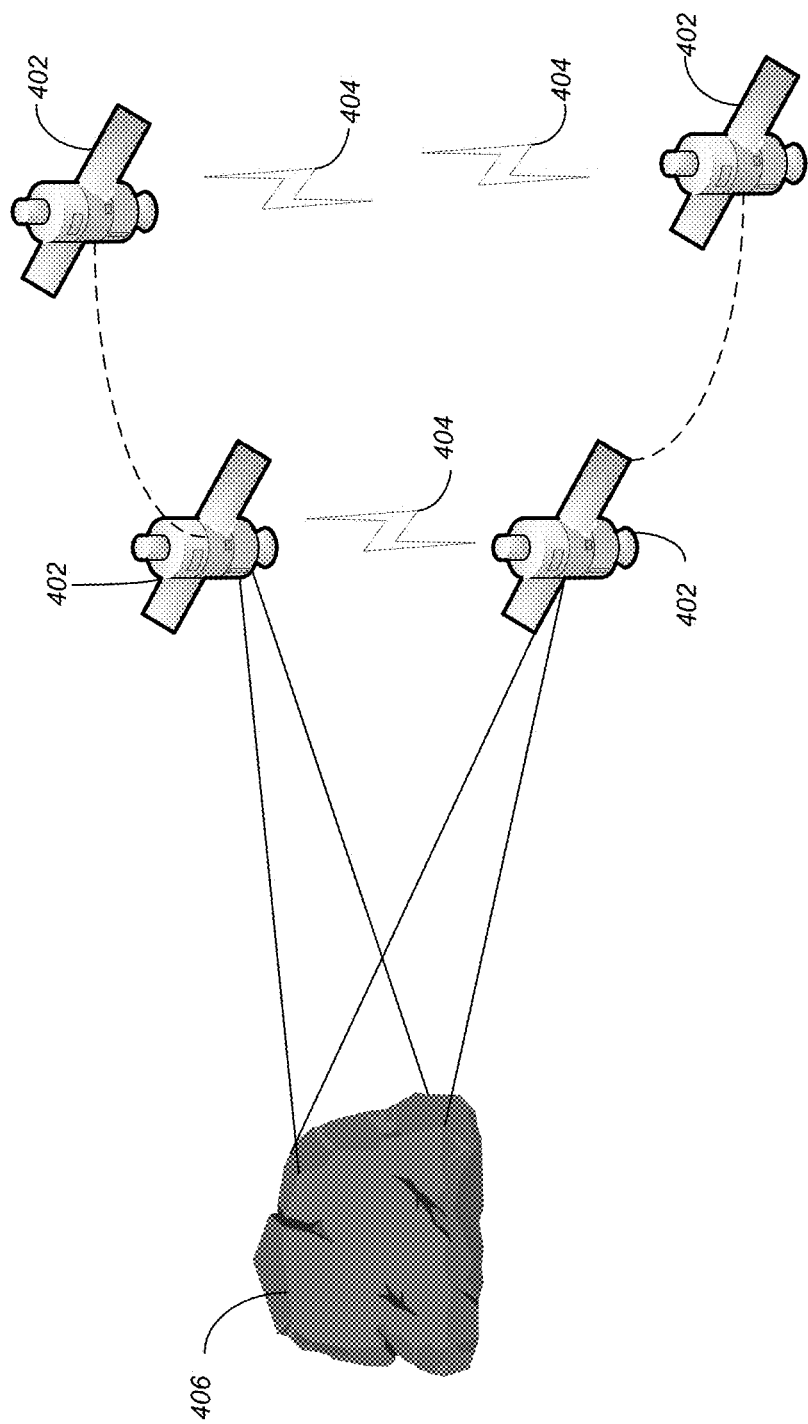
FIG. 4 illustrates an exemplary spacecraft implementation in accordance with one or more embodiments of the invention.

Further to the above, embodiments of the invention may be implemented in spacecraft as illustrated in FIG. 4. Satellites/spacecraft 402 may communicate via communication link 404 to establish a baseline. Images of objects 406 (e.g., an asteroid and/or objects on the asteroid) may be captured and used to reconstruct a 3D image of the objects 406 (e.g., based on an adaptive baseline 3D reconstruction for dual space craft). Alternatively, similar to the aircraft depicted in FIG. 3, two or more cameras on a single satellite/spacecraft 402 may be utilized to simultaneously capture an image of the object 406.

Ship/Marine Craft/Amphibious Vehicle

Embodiments of the invention may also be implemented on any type of marine craft/amphibious vehicle/submersible/semi-submersible. For example, camera systems 102 may be implemented on two boats (or one boat and a shore based rig) or on a single boat (similar to the configuration on a wingtip embodiment described above). Camera 102 may be mounted on a simple vertical post/mast. Range estimation (i.e., the baseline 116) between ships/boats/amphibious vehicles may be conducted using GPS or via radio ranging (or other passive system). Camera modules 104 may be utilized to serve as sensors on a variety of small/large marine/amphibious vehicles.

Figure 5:
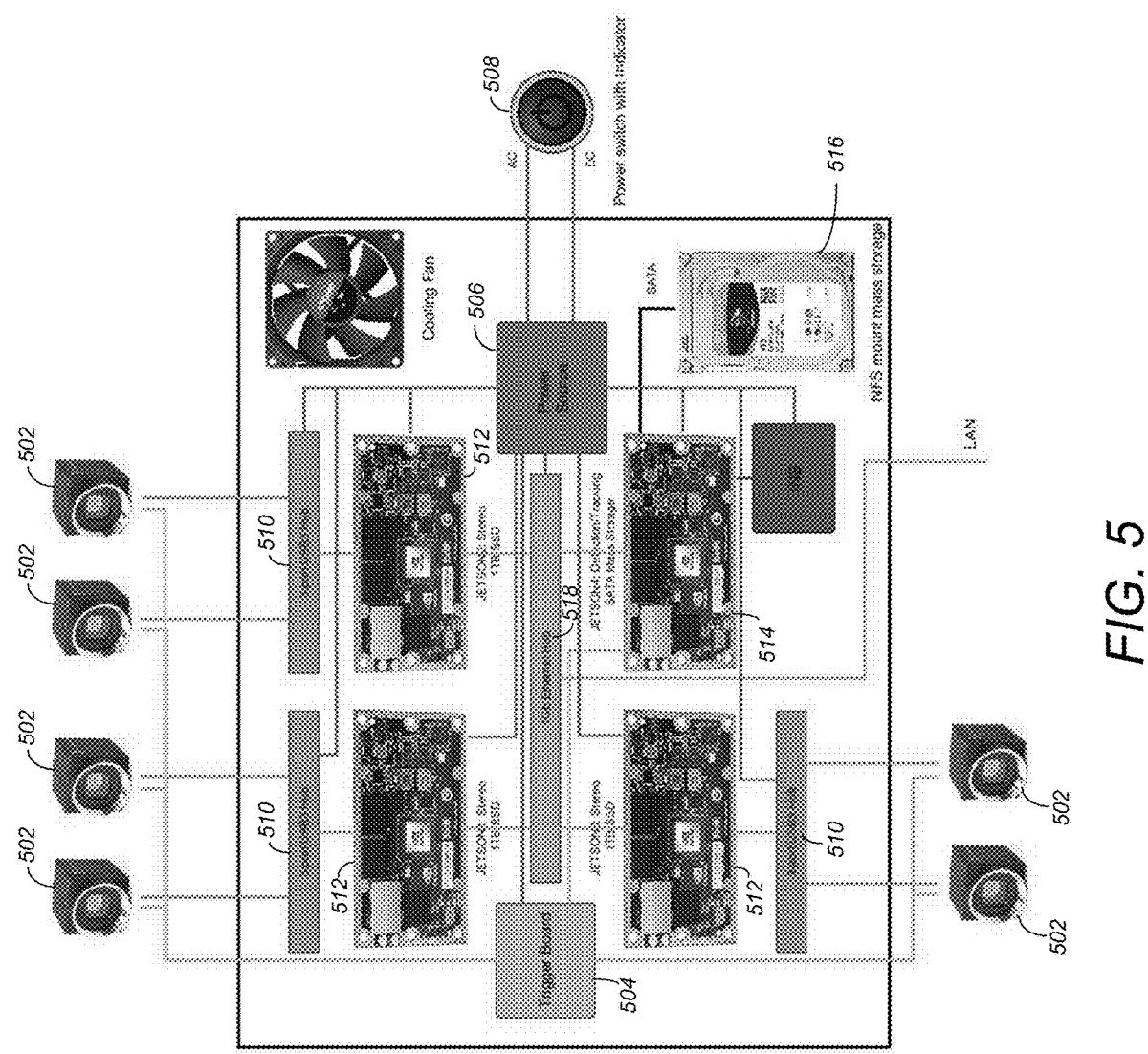
FIG. 5 illustrates hardware components that may be utilized in a camera system in accordance with one or more embodiments of the invention.

FIG. 5 illustrates hardware components that may be utilized in a camera system 102 (e.g., aircraft, ship, or ground vehicle) in accordance with one or more embodiments of the invention. As illustrated various cameras 502 may be synchronized via a trigger board 504. Further, the trigger board 504 is connected to the power source 506 (controlled via power switch with indicator 508). The cameras 502 may further be controlled via individual hubs 510 for each stereo pair to stereo controllers 512 (that further enable the synchronization of the image capture). Detection/tracking (e.g., based on 3D reconstruction of images and feature matching) may be enabled via a detection/tracking SATA (serial attachment) mass storage controller 514. The INS (inertial navigation system) provides information regarding the own vehicles position/orientation and can be shared with the other vehicle to derive range to the contact. The serial detection/tracking 514 may enable storage of the images/3D reconstruction/additional information in an NFS (network file system) mounted mass storage device 516. Communication between the various components 502-516 may further be enabled via an ethernet hub 518.

Further to the above, each camera 502 may also have a GPS aided inertial navigation system/sensor (e.g., inertial measurement unit [IMU]) that provides position, roll, pitch, heading, etc. for each camera 502. While the hardware implementation of FIG. 5 is described for use with ship/marine craft/amphibious vehicles, the hardware may also be used in the other exemplary environments described in this application.

Figure 6:
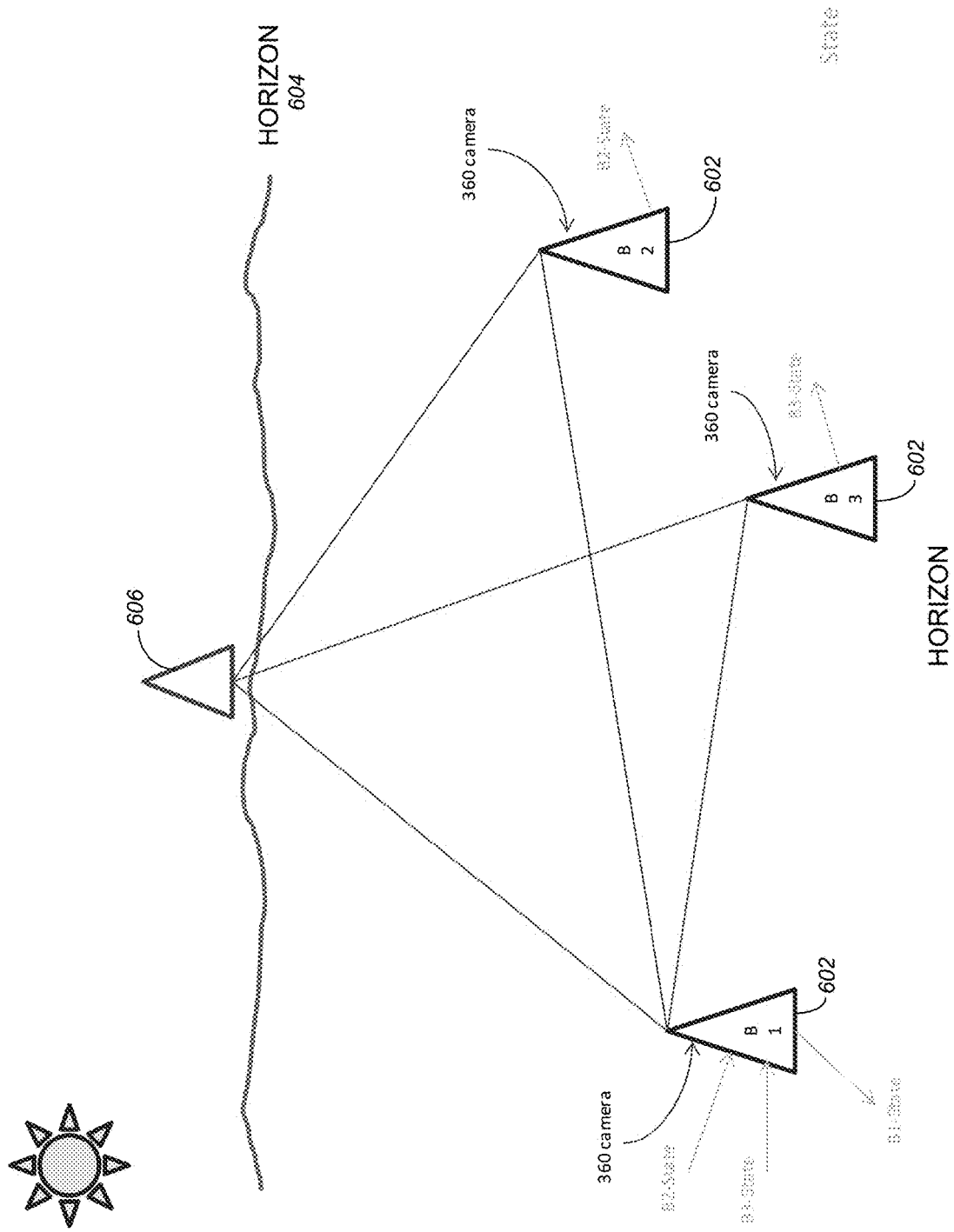
FIG. 6 illustrates the operation of a collaborative stereo system to reconstruct 3D terrain/objects in a maritime environment in accordance with one or more embodiments of the invention.

FIG. 6 illustrates the operation of a collaborative ranging system to locate and estimate speed in a maritime environment in accordance with one or more embodiments of the invention. As illustrated, two or more 360° cameras 602 are utilized (and may be mounted on marine craft/amphibious vehicles). The distance between the cameras 602 (i.e., the baseline 116) may be determined based on any of a variety of available techniques (e.g., GPS, sound navigation and ranging [SONAR], laser distance meter/measurer/rangefinder, radio, geometric computations from known information [e.g., mast height, ship size, etc.], etc.). Further the baseline 116 between cameras 602 may be known/communicated/coordinated as multiple ships/vehicles/aircraft may be operating together within a fleet/swarm. The precision of the baseline information 116 may be reflected in and taken into account during any computation of the range estimate.

In the maritime environment, the horizon 604 establishes a base level. In this regard, any geometry/object/item 606 that protrudes a threshold distance above the horizon may be identified as object/terrain. The cameras 602 (on each boat "B" [B1, B2, and B3]) simultaneously capture images of object 606 and based on feature matching and the baseline between the objects, a range to the object 606 may be estimated.

Further to the above, to provide navigation assistance on water, embodiments of the invention merely identify the surface by segmentation of the sky from the water.

Land-Based Vehicle

In one or more embodiments, the different configurations described above may be utilized on any terrain and/or ground based vehicles such as a truck, motorcycle, automobile, bicycle, or handheld/carried device (e.g., helmet mounted), etc. (manned or unmanned).

Software Architecture

Figure 7:
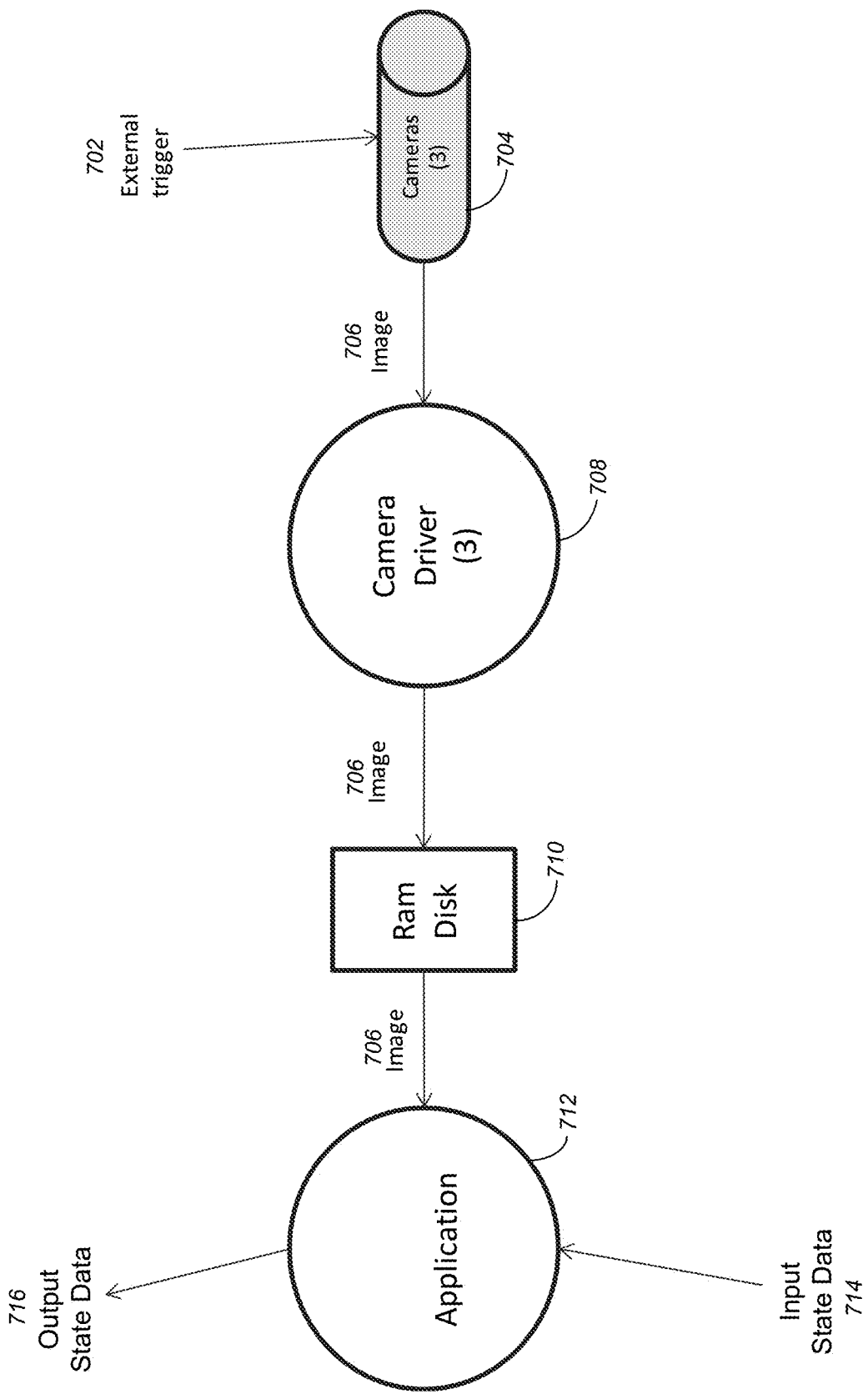
FIG. 7 illustrates an exemplary software architecture for a collaborative stereo system for 3D terrain and object reconstruction in accordance with one or more embodiments of the invention.

FIG. 7 illustrates an exemplary software architecture for a collaborative stereo system for 3D terrain and object reconstruction in accordance with one or more embodiments of the invention. External triggers 702 are used to simultaneously activate cameras 704 to capture images 706 via camera drivers 708 (one camera driver 708 may correspond to each camera 704). The images 706 are stored in RAM (random access memory) and/or disk 710. The images 706 are then processed by application 712 (e.g., a surveillance and/or 3D image reconstruction application), based on input state data 714 (e.g., baseline 116 information, and or other distance/geometric information) to output state data 716. Such output state data 716 may consist of a 3D image/model of the terrain/object captured in the images 706 (static or non-static/moving), navigation/collision avoidance instruction/information, reconnaissance information, etc.

Logical Flow

Figure 8:
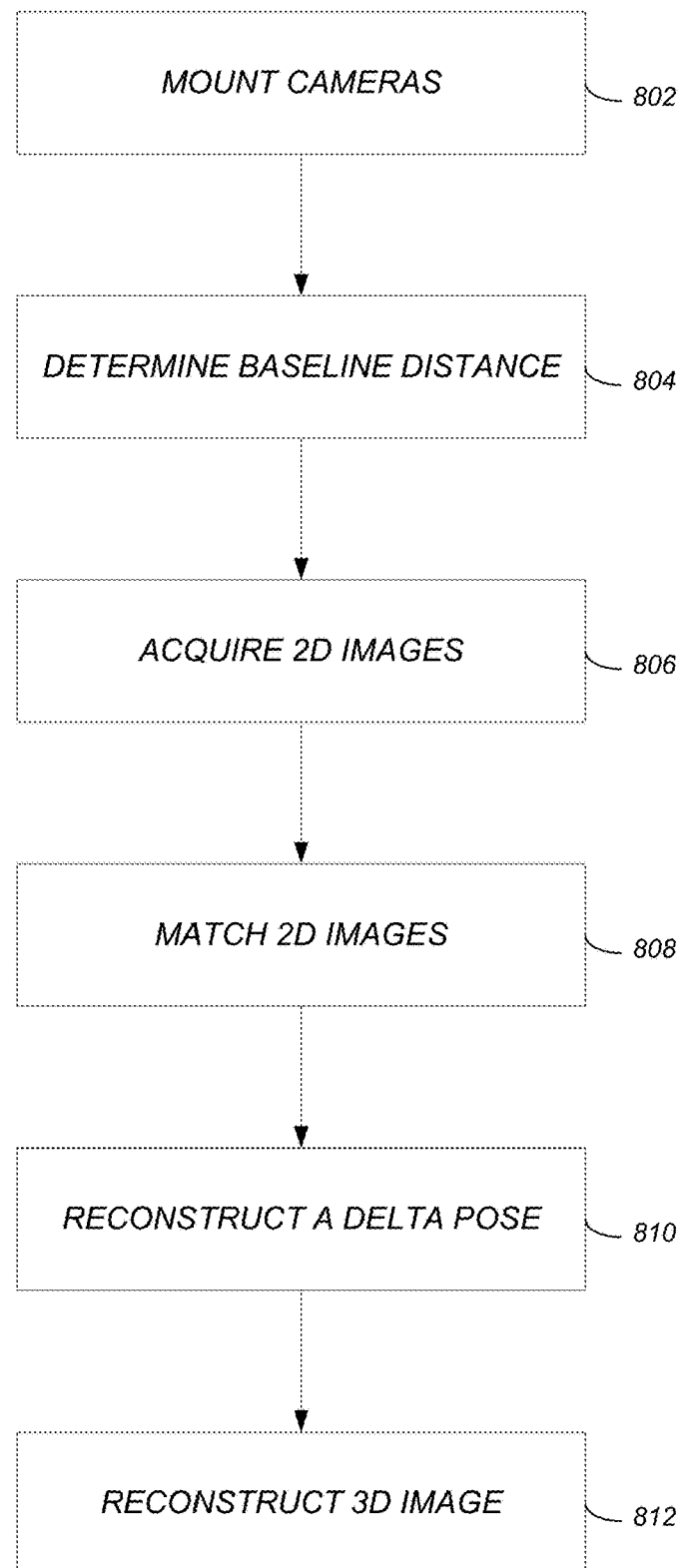
FIG. 8 illustrates the logical flow for 3D image reconstructing in accordance with one or more embodiments of the invention.

FIG. 8 illustrates the logical flow for 3D image reconstructing in accordance with one or more embodiments of the invention.

At step 802, two or more cameras are mounted to one or more vehicles (the cameras are capable of moving with respect to each other [e.g., either the cameras are fixed to vehicles that move or the cameras themselves move).

In one or more embodiments, the cameras are mounted to two or more unmanned air vehicles (UAVs) that fly in tandem during the acquiring thereby forming a virtual stereo camera system. In such embodiments, an accuracy of the reconstructing may be controlled during flight of the UAVs by adjusting the baseline distance between the two or more cameras. In alternative embodiments, the vehicle is an airplane, and the two or more cameras are mounted to wingtips of the airplane. In yet another alternative embodiment, one of the vehicles may be a boat or ship, at least one of the two or more cameras is mounted to a vertical post on the boat or ship, and further processing (e.g., matching) is based on objects identified that protrude from a horizon of a body of water. In such an implementation, the 3D image may be reconstructed as a single pixel, a partial image, or a full image. In this regard, as used herein, one of the two cameras may be selected as a reference camera that provides a reference image, and the 3D image is the reference image with a range value (of the distance or a representative of the distance to the reference camera) assigned to each pixel. For example, the range value may be a disparity value that consists of a displacement of the same object point in the two camera images.

At step 804, a baseline distance between each of the two or more cameras is determined (e.g., based on one or more ranging sensors).

At step 806, a two-dimensional (2D) image is simultaneously acquired from each of the two or more cameras. The acquiring is time synchronized and at least one of the cameras may be moving during the acquiring. Such time synchronization may be enabled using clock synchronization over wireless communications. Alternatively (or in addition), the time synchronization may be enabled using a wired communicative coupling between the two or more cameras.

At step 808, two or more of the 2D images from the two or more cameras are matched. In one or more embodiments, the matching may include identifying multiple features in each of the two or more 2D images, matching multiple features from the 2D images, and determining the delta pose of each of the cameras based on the matching of the multiple features and the baseline distance (e.g., and/or the altitude).

At step 810, a delta pose between the two or more cameras are reconstructed (based on the matching and the baseline distance). The delta pose consists of a delta position and a delta orientation.

At step 812, based on the delta pose, a 3D image is instantaneously reconstructed. The 3D image consists of information in the matched 2D images. Such a 3D image may be terrain and/or detected moving objects (e.g., on the ground, on a body of water, aerially, and/or in space). Further, in embodiments where a delta pose is computed, the 3D image construction may further be based on the delta pose.

Computer Hardware Environment

Figure 9:
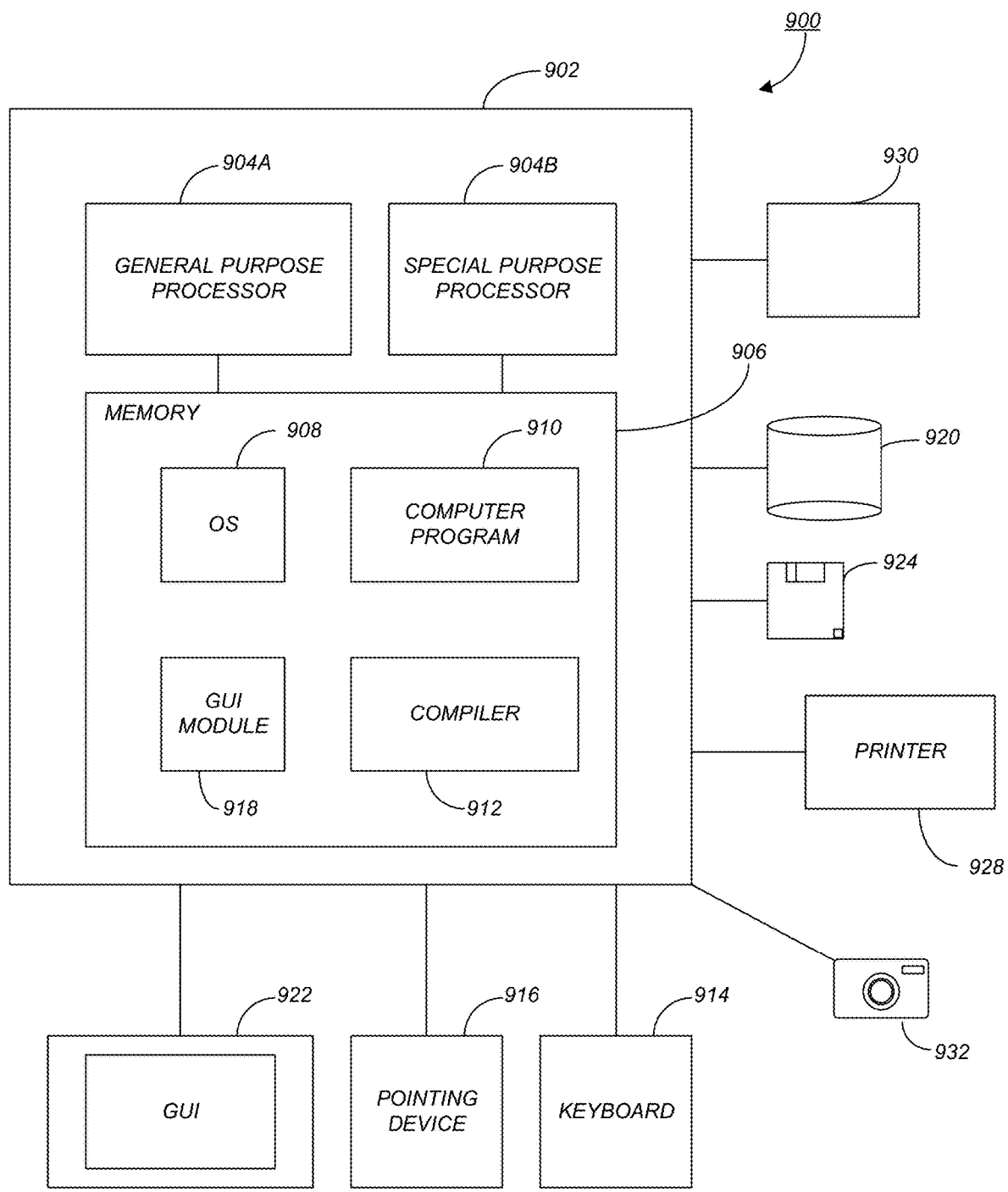
FIG. 9 is an exemplary computer hardware and software environment used to implement one or more embodiments of the invention.

FIG. 9 is an exemplary computer hardware and software environment 900 used to implement one or more embodiments of the invention. The hardware and software environment includes some details/components of the image acquiring system that may be utilized in accordance with one or more embodiments of the invention. System 900 includes a computer 902 and may include peripherals. Computer 902 may be a user/client computer, server computer, or may be a database computer. The computer 902 comprises a general purpose hardware processor 904A and/or a special purpose hardware processor 904B (hereinafter alternatively collectively referred to as processor 904) and a memory 906, such as random access memory (RAM). The computer 902 may be coupled to, and/or integrated with, other devices, including input/output (I/O) devices such as a keyboard 914, a cursor control device 916 (e.g., a mouse, a pointing device, pen and tablet, touch screen, multi-touch device, etc.) and a printer 928. In one or more embodiments, computer 902 may be coupled to, or may comprise, a camera 932 of image acquisition device (e.g., a cellular device, personal digital assistant, etc.). In yet another embodiment, the computer 902 may comprise a multi-touch device, mobile phone, gaming system, internet enabled television, television set top box, or other internet enabled device executing on various platforms and operating systems.

In one embodiment, the computer 902 operates by the general purpose processor 904A performing instructions defined by the computer program 910 under control of an operating system 908. The computer program 910 and/or the operating system 908 may be stored in the memory 906 and may interface with the user and/or other devices to accept input and commands and, based on such input and commands and the instructions defined by the computer program 910 and operating system 908, to provide output and results.

Output/results may be presented on the display 922 or provided to another device for presentation or further processing or action. In one embodiment, the display 922 comprises a liquid crystal display (LCD) having a plurality of separately addressable liquid crystals. Alternatively, the display 922 may comprise a light emitting diode (LED) display having clusters of red, green and blue diodes driven together to form full-color pixels. Each liquid crystal or pixel of the display 922 changes to an opaque or translucent state to form a part of the image on the display in response to the data or information generated by the processor 904 from the application of the instructions of the computer program 910 and/or operating system 908 to the input and commands. The image may be provided through a graphical user interface (GUI) module 918. Although the GUI module 918 is depicted as a separate module, the instructions performing the GUI functions can be resident or distributed in the operating system 908, the computer program 910, or implemented with special purpose memory and processors.

In one or more embodiments, the display 922 is integrated with/into the computer 902 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD), portable/handheld game/music/video player/console devices (e.g., IPOD TOUCH, MP3 players, NINTENDO 3DS, PLAYSTATION PORTABLE, etc.), touch tables, and walls (e.g., where an image is projected through acrylic and/or glass, and the image is then backlit with LEDs).

Some or all of the operations performed by the computer 902 according to the computer program 910 instructions may be implemented in a special purpose processor 904B. In this embodiment, some or all of the computer program 910 instructions may be implemented via firmware instructions stored in a read only memory (ROM), a programmable read only memory (PROM) or flash memory within the special purpose processor 904B or in memory 906. The special purpose processor 904B may also be hardwired through circuit design to perform some or all of the operations to implement the present invention. Further, the special purpose processor 904B may be a hybrid processor, which includes dedicated circuitry for performing a subset of functions, and other circuits for performing more general functions such as responding to computer program 910 instructions. In one embodiment, the special purpose processor 904B is an application specific integrated circuit (ASIC).

The computer 902 may also implement a compiler 912 that allows an application or computer program 910 written in a programming language such as C, C++, Assembly, SQL, PYTHON, PROLOG, MATLAB, RUBY, RAILS, HASKELL, or other language to be translated into processor 904 readable code. Alternatively, the compiler 912 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 910 accesses and manipulates data accepted from I/O devices and stored in the memory 906 of the computer 902 using the relationships and logic that were generated using the compiler 912.

The computer 902 also optionally comprises an external communication device such as a modem, satellite link, Ethernet card, or other device for accepting input from, and providing output to, other computers 902.

In one embodiment, instructions implementing the operating system 908, the computer program 910, and the compiler 912 are tangibly embodied in a non-transitory computer-readable medium, e.g., data storage device 920, which could include one or more fixed or removable data storage devices, such as a zip drive, floppy disc drive 924, hard drive, CD-ROM drive, tape drive, etc. Further, the operating system 908 and the computer program 910 are comprised of computer program 910 instructions which, when accessed, read and executed by the computer 902, cause the computer 902 to perform the steps necessary to implement and/or use the present invention or to load the program of instructions into a memory 906, thus creating a special purpose data structure causing the computer 902 to operate as a specially programmed computer executing the method steps described herein.

Computer program 910 and/or operating instructions may also be tangibly embodied in memory 906 and/or data communications devices 930, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 902 and or camera 932.

CONCLUSION

This concludes the description of the preferred embodiment of the invention. In view of the above, embodiments of the invention provide a wide-baseline 3D reconstruction system that is capable of providing instantaneous 3D information (e.g., using light weight sensors [cameras]). A wide baseline increases the accuracy of 3D reconstruction. Further, passive ranging systems leave no signature at the target. Embodiments further enable tracking of movers on the ground and enable terrain relative navigation (TRN) and collision avoidance in non-static environments (e.g., space small body missions [e.g., asteroids], and an adaptive stereo baseline to provide increased depth accuracy).

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for three-dimensional (3D) image reconstructing, comprising:
   mounting two or more cameras to one or more vehicles, wherein the two or more cameras are capable of moving with respect to each other;
   determining a baseline distance between each of the two or more cameras, wherein the two or more cameras are secured such that the baseline distance and camera movement with respect to each other is based on a geometry of the one or more vehicles that the two or more cameras are secured to;
   simultaneously acquiring a two-dimensional (2D) image from each of the two or more cameras, wherein the acquiring is time synchronized;
   matching two or more of the 2D images from the two or more cameras;
   reconstructing a delta pose between the two or more cameras based on the matching and the baseline distance, wherein the delta pose comprises a delta position and a delta orientation;
   based on the delta pose, instantaneously reconstructing a 3D image, wherein the 3D image comprises information in the matched 2D images.

2. The method of claim 1, wherein:
   the two or more cameras are mounted to two or more unmanned aerial vehicles (UAVs) that fly in tandem during the acquiring thereby forming a virtual stereo camera system; and
   an accuracy of the reconstructing is controlled during flight of the UAVs by adjusting the baseline distance between the two or more cameras by adjusting a distance between the two or more UAVs.

3. The method of claim 1, wherein:
   the acquiring is time synchronized using clock synchronization over wireless communications.

4. The method of claim 1, wherein:
the acquiring is time synchronized using a wired communicative coupling between the two or more cameras.

5. The method of claim 1, wherein:
the baseline distance is determined based on one or more ranging sensors.

6. The method of claim 1, wherein:
the 3D image comprises terrain.

7. The method of claim 1, wherein:
the 3D image comprises detected moving objects.

8. The method of claim 1, wherein:
the matching the two or more 2D images comprises:
identifying multiple features in each of the two or more 2D images;
matching the multiple features from two or more of the two more 2D images; and
determining the delta pose of each of the two or more cameras based on the matching of the multiple features and the baseline distance.

9. The method of claim 1, wherein:
one of the one or more vehicles comprises an airplane;
the two or more cameras are mounted to wingtips of the airplane.

10. The method of claim 1, wherein:
one of the one or more vehicles comprises a boat or ship;
at least one of the two or more cameras is mounted to a vertical post on the boat or ship; and
the matching is based on objects identified that protrude from a horizon of a body of water.

11. The method of claim 10, wherein:
the 3D image comprises a partial image.

12. A system for three-dimensional (3D) image reconstructing, comprising:
(a) two or more image acquiring systems, wherein each of the two or more image acquiring systems comprise:
  (1) a camera mounted to a vehicle, wherein the camera is capable of moving with respect to another camera;
  (2) a ranging sensor that determines a baseline distance from one of the other image acquiring systems, wherein each camera is secured to the vehicle such that the baseline distance and camera movement with respect to another camera is based on a geometry of the vehicle each camera is secured to;
  (3) a synchronous trigger that triggers the camera to simultaneously acquire a two-dimensional (2D) image simultaneously with another of the two or more image acquiring systems, wherein the acquiring is time synchronized;
(b) a camera pose estimation module that:
  (1) matches two or more of the 2D images from the two or more image acquiring systems; and
  (2) reconstructs a delta pose between cameras in the two or more image acquiring systems based on the matches and the baseline distance, wherein the delta pose comprises a delta position and a delta orientation;
(c) a reconstructing module that, based on the delta pose, instantaneously reconstructs a 3D image, wherein the 3D image comprises information in the matched 2D images.

13. The system of claim 12, wherein:
the two or more image acquiring systems are mounted to two or more unmanned aerial vehicles (UAVs) that fly in tandem when acquiring the 2D images thereby forming a virtual stereo camera system; and
an accuracy of the reconstructing module is controlled during flight of the UAVs by adjusting the baseline distance between two or more of the cameras by adjusting a distance between the two or more UAVs.

14. The system of claim 12, wherein:
the synchronous trigger is time synchronized using clock synchronization over wireless communications.

15. The system of claim 12, wherein:
the synchronous trigger is time synchronized using a wired communicative coupling between the two or more image acquiring systems.

16. The system of claim 12, wherein:
the 3D image comprises terrain.

17. The system of claim 12, wherein:
the 3D image comprises detected moving objects.

18. The system of claim 12, wherein:
each of the two or more image acquiring systems further comprises:
a feature extraction module that extracts multiple features from the 2D image that is acquired;
the camera pose estimation module:
matches the multiple features from two or more of the 2D images; and
determines a delta pose of each camera based on the matching of the multiple features and the baseline distance.

19. The system of claim 12, wherein:
the vehicle comprises an airplane;
the cameras in the two or more image acquiring systems are mounted to wingtips of the airplane.

20. The system of claim 12, wherein:
the vehicle comprises a boat or ship;
the camera is mounted to a vertical post on the boat or ship; and
the camera pose estimation module matches the 2D images based on objects identified that protrude from a horizon of a body of water.

* * * * *